(12) United States Patent
Sladen

(10) Patent No.: US 7,969,503 B2
(45) Date of Patent: Jun. 28, 2011

(54) PORTABLE ELECTRONIC DEVICE FOR CAPTURING IMAGES

(75) Inventor: Peter Sladen, Hants (GB)

(73) Assignee: Nokia Corporation, Espoo (FI)

( * ) Notice: Subject to any disclaimer, the term of this patent is extended or adjusted under 35 U.S.C. 154(b) by 637 days.

(21) Appl. No.: 11/884,625

(22) PCT Filed: Feb. 18, 2005

(86) PCT No.: PCT/IB2005/000437
§ 371 (c)(1),
(2), (4) Date: Mar. 31, 2008

(87) PCT Pub. No.: WO2006/087599
PCT Pub. Date: Aug. 24, 2006

(65) Prior Publication Data
US 2008/0273112 A1    Nov. 6, 2008

(51) Int. Cl.
*H04N 5/222* (2006.01)
*H04N 5/225* (2006.01)
(52) U.S. Cl. .......................... 348/371; 348/373
(58) Field of Classification Search .................. None
See application file for complete search history.

(56) References Cited

U.S. PATENT DOCUMENTS

| | | | | |
|---|---|---|---|---|
| 3,794,822 A | | 2/1974 | Bergmans | 240/1.3 |
| 4,233,648 A | * | 11/1980 | Geissler | 362/17 |
| 5,126,778 A | * | 6/1992 | Wheeler et al. | 396/106 |
| 5,347,339 A | * | 9/1994 | Terada et al. | 396/62 |
| 5,406,343 A | * | 4/1995 | Stephenson | 396/174 |
| 5,408,389 A | | 4/1995 | Burlingame | 362/35 |
| 5,717,964 A | * | 2/1998 | Dowe | 396/165 |
| 5,734,934 A | * | 3/1998 | Horinishi et al. | 396/62 |
| 5,772,302 A | * | 6/1998 | Ishikawa et al. | 362/3 |
| 5,854,949 A | * | 12/1998 | Furukawa et al. | 396/200 |
| 5,999,751 A | * | 12/1999 | Imamura et al. | 396/200 |
| 6,352,357 B1 | * | 3/2002 | Woolard | 362/277 |
| 6,400,905 B1 | | 6/2002 | Tenmyo | 396/175 |
| 6,445,885 B2 | * | 9/2002 | Nakanishi et al. | 396/176 |
| 6,573,939 B1 | * | 6/2003 | Yokoyama | 348/375 |
| 6,750,916 B1 | * | 6/2004 | Isashi et al. | 348/376 |
| 7,108,406 B2 | * | 9/2006 | Moriyasu et al. | 362/427 |
| 7,345,833 B2 | * | 3/2008 | Hwang | 359/819 |
| 7,428,017 B2 | * | 9/2008 | Yoshida et al. | 348/375 |
| 7,430,013 B2 | * | 9/2008 | Yang et al. | 348/376 |
| 7,567,283 B2 | * | 7/2009 | Lee et al. | 348/335 |
| 7,576,785 B2 | * | 8/2009 | Jung et al. | 348/227.1 |
| 7,623,782 B2 | * | 11/2009 | Yu | 396/542 |
| 2001/0053703 A1 | * | 12/2001 | Kobayashi | 455/556 |
| 2003/0013484 A1 | * | 1/2003 | Nishimura et al. | 455/556 |
| 2004/0132491 A1 | * | 7/2004 | Kim et al. | 455/556.1 |
| 2005/0014538 A1 | * | 1/2005 | Hyun et al. | 455/575.4 |

(Continued)

FOREIGN PATENT DOCUMENTS

CN    1577043 A    2/2004

(Continued)

*Primary Examiner* — Sinh Tran
*Assistant Examiner* — Jason A Flohre
(74) *Attorney, Agent, or Firm* — Harrington & Smith

(57) ABSTRACT

A portable electronic device having a main body, the device including a camera arrangement for capturing images in a plurality of directions relative to the main body of the device; a lighting element; and a reflector, at least a portion of which is movable about the lighting element to change the direction of light reflected from the lighting element.

18 Claims, 5 Drawing Sheets

| U.S. PATENT DOCUMENTS | | | | |
|---|---|---|---|---|
| 2005/0024500 A1* | 2/2005 | Katayama | | 348/207.99 |
| 2005/0025473 A1 | 2/2005 | Hirai | | 396/100 |
| 2005/0054377 A1* | 3/2005 | Yeh | | 455/556.1 |
| 2005/0253923 A1* | 11/2005 | Komori et al. | | 348/14.02 |

| FOREIGN PATENT DOCUMENTS | | |
|---|---|---|
| GB | 1 498 868 | 1/1978 |
| JP | 2004-317880 A | 11/2004 |
| JP | 2004-343502 A | 12/2004 |

* cited by examiner

PORTABLE ELECTRONIC DEVICE FOR CAPTURING IMAGES

FIELD OF THE INVENTION

Embodiments of the present invention relate to a portable electronic device for capturing images. In particular, they relate to a portable electronic device for capturing images in a plurality of directions relative to the main body of the device.

BACKGROUND TO THE INVENTION

A camera captures an image by recording the light that enters its aperture, from a subject. In order to improve the quality of an image in low light conditions, many cameras use an electronic flash. An electronic flash is arranged so that at the time that the image is captured, a burst of light is emitted in the direction from which the image is captured, improving the quality of the image.

In some more recent devices, a movable camera element is used. The camera element may rotate about an axis, enabling a user to capture images, from a plurality of directions relative to the main body of the device. Rotatable cameras are particularly popular in mobile telephones, as they enable the camera to be directed towards the user of that mobile telephone during video calls and they enable the user to capture images from a direction away from him at other times.

Portable electronic devices that incorporate such rotatable camera apertures may also incorporate a lighting element to improve the level of light entering the aperture when capturing images in low light conditions. The lighting element is typically a white LED, fixed at a position within the housing of the telephone. If the user rotates the camera to capture images in a different direction, the direction in which light is emitted by the lighting element may no longer correspond with the direction from which images are captured. He may therefore be unable to use the lighting element when capturing such an image.

Alternatively, the user may decide to rotate the whole body of the device to capture an image from a different direction. However, the user may then not be able to see the display.

Flash circuitry is used to drive an electronic flash. Previous proposals have put the whole of the flash circuitry into the movable flash element, to avoid the use of moving contacts, in view of the high current and voltages required by the flash tube. However, this results in a very large movable flash element due to the size of some of the components of the flash circuitry, such as the main capacitor.

According to a first aspect of the present invention, there is provided a portable electronic device having a main body, the device comprising: a camera arrangement for capturing images in a plurality of directions relative to the main body of the device; a lighting element; and a reflector, at least a portion of which is movable about the lighting element to change the direction of light reflected from the lighting element.

The camera arrangement may comprise a camera with an aperture movable relative to the main body to change the direction from which images are captured. The camera aperture may be movable by a user. The camera aperture may be movable by rotation.

The reflector may be movable by a user. The reflector may be movable by rotation around the lighting element. The camera aperture and the reflector may be movable by rotation around substantially parallel axes. The camera aperture and the reflector may be movable by rotation around substantially the same axis.

The device may further comprise coupling means acting between the reflector and the camera arrangement and so arranged that movement of the camera aperture causes movement of the reflector. The coupling means may be arranged to provide at least two positions for the camera aperture at which there is substantial alignment between the direction from which images are captured and the direction to which light is reflected, in use, by the reflector.

The camera arrangement may be for capturing images in a first direction and in a second direction which is substantially opposite to the first direction. The reflector may have a curved surface. The reflector may be paraboloidal. The lighting element may have an elongate portion and the reflector may be movable around the elongate portion.

The lighting element may be fixedly positioned in the main body. The device may further comprise drive circuitry which is fixedly positioned in the main body of the device to operate the lighting element. The electrical connector that connects the lighting element and the drive circuit may be fixedly positioned in the main body.

The lighting element may comprise a xenon tube. The reflector may be electrically connected to a voltage source and the xenon may be at least partially ionisable by the application of a voltage to the reflector. The electrical connection between the reflector and the voltage source may have a movable connection point at the reflector. Movement of the reflector may cause the connection point at the reflector to move. The electrical connection between the reflector and the voltage source may have a fixed connection point at the reflector.

The reflector may comprise two co-operating separate reflecting parts that are arranged for relative movement. A first part of the reflector may be rotatable about the lighting element and a second part of the reflector may be fixed in relation to the main body of the device. An electrical connection between the second fixed part of the reflector and a voltage source may have a fixed connection point at the second fixed part of the reflector.

According to a second aspect of the present invention, there is provided a method of capturing an image using a portable electronic device having a camera arrangement for capturing images in a plurality of directions and a lighting element, comprising: moving at least a portion of a reflector about the lighting element to change the direction of light from the lighting element; and capturing an image with the camera arrangement using the directed light from the lighting element.

The camera arrangement may be adjusted to change the direction from which images are captured, to correspond with the direction to which light is directed by the reflector.

According to a third aspect of the present invention, there is provided a camera lighting arrangement for providing illumination in one of multiple directions, comprising: a lighting element; and a curved reflector, at least a portion of which is rotatable about the lighting element to position a gap through which illumination is provided wherein the lighting element is located between the gap and the rotatable portion of the reflector.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

The figures illustrate a portable electronic device 100/200/300 having a main body 42, the device 100/200/300 comprising: a camera arrangement 32 for capturing images in a plurality of directions relative to the main body 42 of the device 100/200/300; a lighting element 14; and a reflector 12, at least a portion of which is movable about the lighting element 14 to change the direction of light reflected from the lighting element 14.

Figure 1:
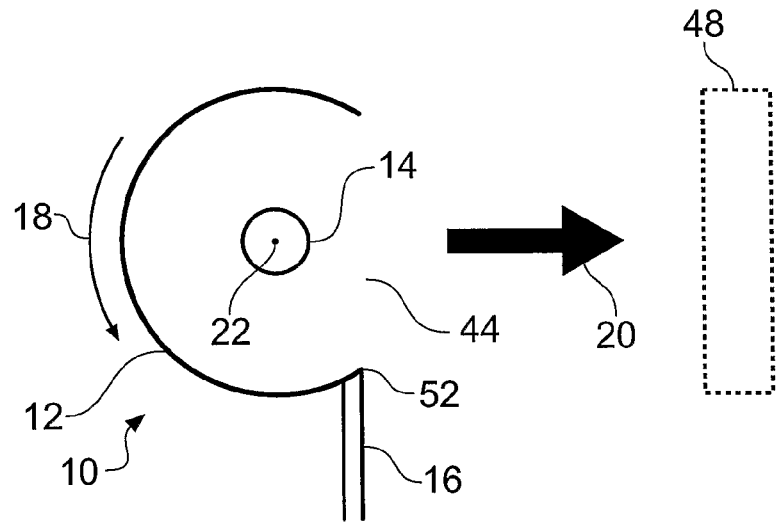
FIG. 1 illustrates a side elevation of a flash unit.
Figure 2:
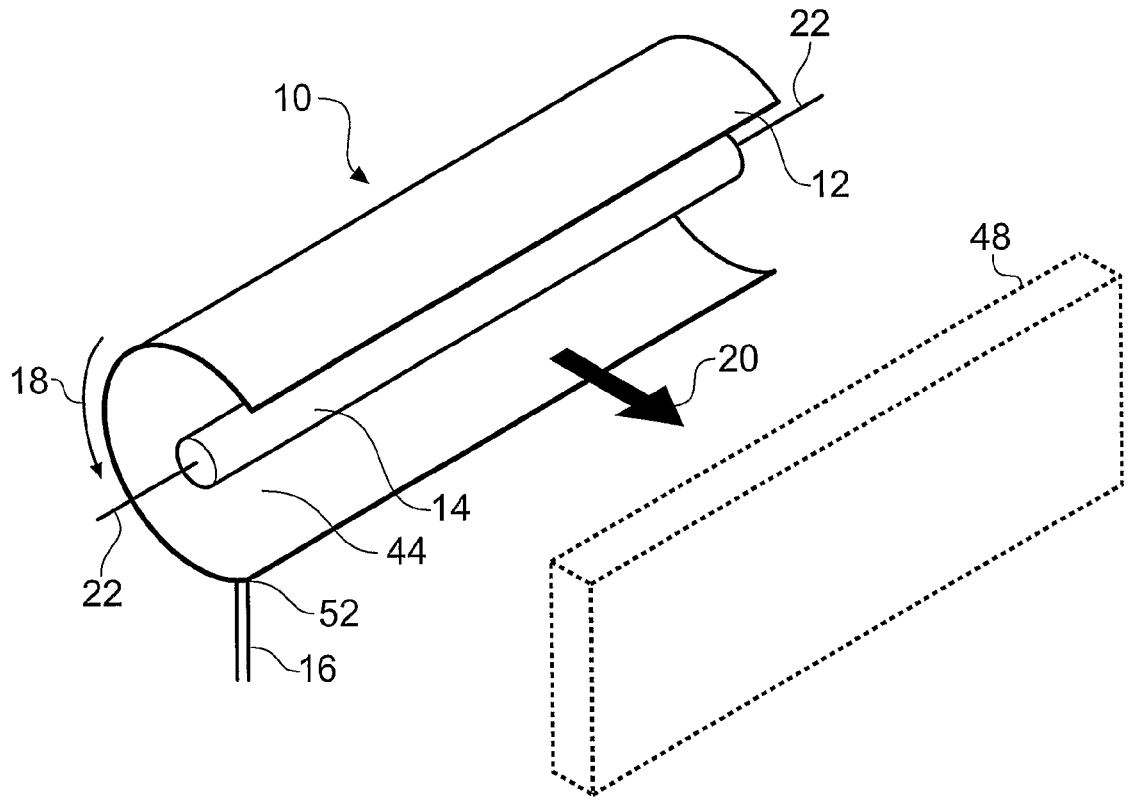
FIG. 2 illustrates a perspective view of the flash unit.

FIGS. 1 and 2 illustrate a flash unit 10 for use in the device 100/200/300. The flash unit 10 comprises a paraboloidal reflector 12, a lighting element 14, an electrical connector 16 and electrical connectors 22. The lighting element 14 is typically a xenon tube. The xenon tube 14 is used to create a short flash of light with a high intensity while an image is being captured, to allow the user to capture a better quality image. In order to direct the light produced by the element 14 towards the subject, a reflector 12 is used.

In order to produce light using the xenon tube 14, the xenon gas mixture in the tube must be ionised. Ionisation is achieved by applying a trigger pulse of a very high voltage (such as a few thousand volts) but low current, close to the tube 14. When the xenon gas has been ionised, current is then able to flow through the tube 14 between the connectors 22, causing the xenon to generate light. The voltage that is used to ionise the xenon in the xenon tube 14 is commonly known as the "trigger voltage".

In FIGS. 1 and 2, the trigger voltage is applied to the reflector 12, which is metallic or metalised. The voltage is applied using the electrical connector 16. In this case, therefore, the reflector 12 also acts as a "trigger plate". The current which flows through the xenon tube 14, between the connectors 22, is much higher than the current carried by the trigger plate.

In the embodiment illustrated in FIGS. 1 and 2, the lighting element 14 is an elongate, cylindrical xenon tube. The reflector 12 is elongate, curved and located around the tube 14, leaving a gap 44. Light leaves the tube 14 in all directions, but any light which does not pass directly through the gap 44 in the reflector 12 will be reflected towards the gap 44. The tube 14 and the reflector 12 are positioned in such a way that the light exits in the general direction of the large arrow 20.

The geometry of the tube 14 and the reflector 12, such as the relative positioning of the tube 14 and the reflector 12, the curvature of the reflector 12 and the size of the gap 44, can be used to set configuration of the beam of light emitted from the gap 44. For instance, a larger gap 44 in the reflector 12 will result in a wider beam of light being emitted from the gap 44. The flash unit 10 may also comprise a lens 48 to direct the light after it has been emitted from the gap 44.

The reflector 12 is rotatable, about the xenon tube 14 in the direction of arrow 18, to change the direction 20, relative to the tube 14. If the flash unit comprises a lens 48, the lens 48 may also rotate with the reflector 12.

In both FIGS. 1 and 2, it can be seen that the reflector 12 can rotate around at least 180°. By rotating the reflector 12, therefore, the user may direct the light where he chooses without having to rotate the whole of the flash unit 10.

As the reflector 12 rotates, the position of the connector 16 remains fixed. The reflector 12 therefore rotates relative to the connector 16 and the point of connection 52 between the connector 16 and the reflector 12 therefore varies as the reflector 12 moves, but the ability to apply the trigger voltage to the reflector 12 is retained as the reflector moves.

The connection between the reflector 12 and the flash circuitry 80 is required to carry a very high voltage (the trigger voltage) but very low current. As a consequence of this, a wiper connector 16 such as that illustrated in FIGS. 1 and 2 is adequate.

Figure 4:
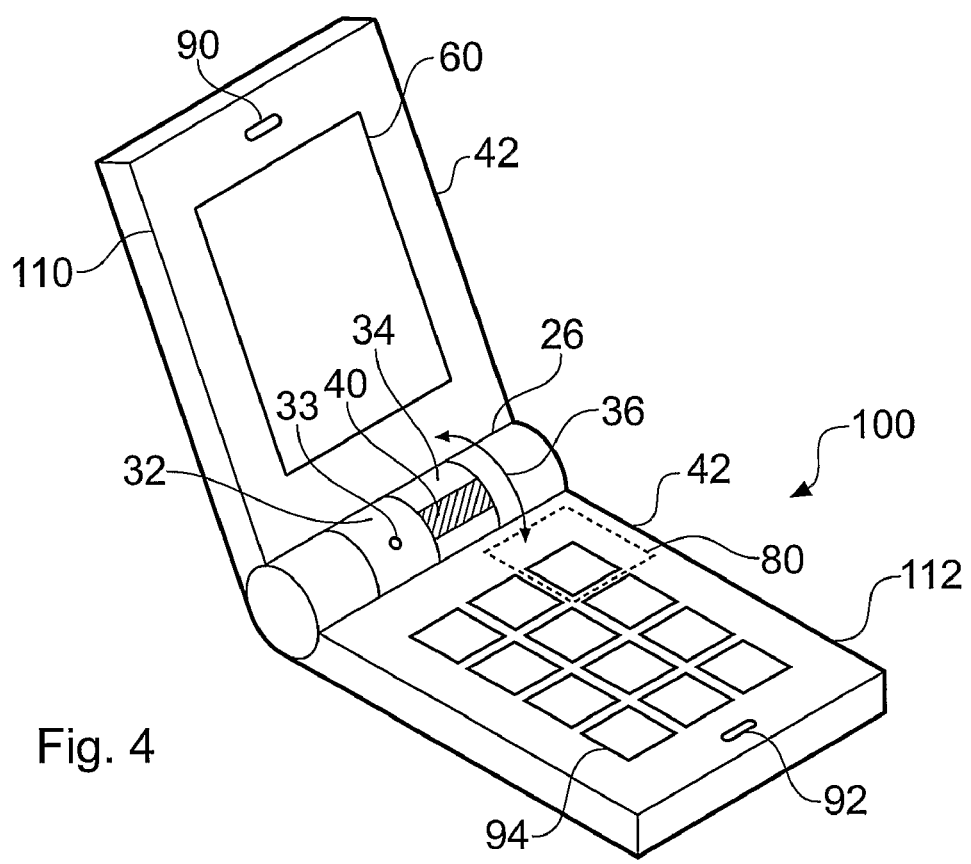
FIG. 4 illustrates a first portable radio telephone comprising a rotating flash unit.
Figure 5:
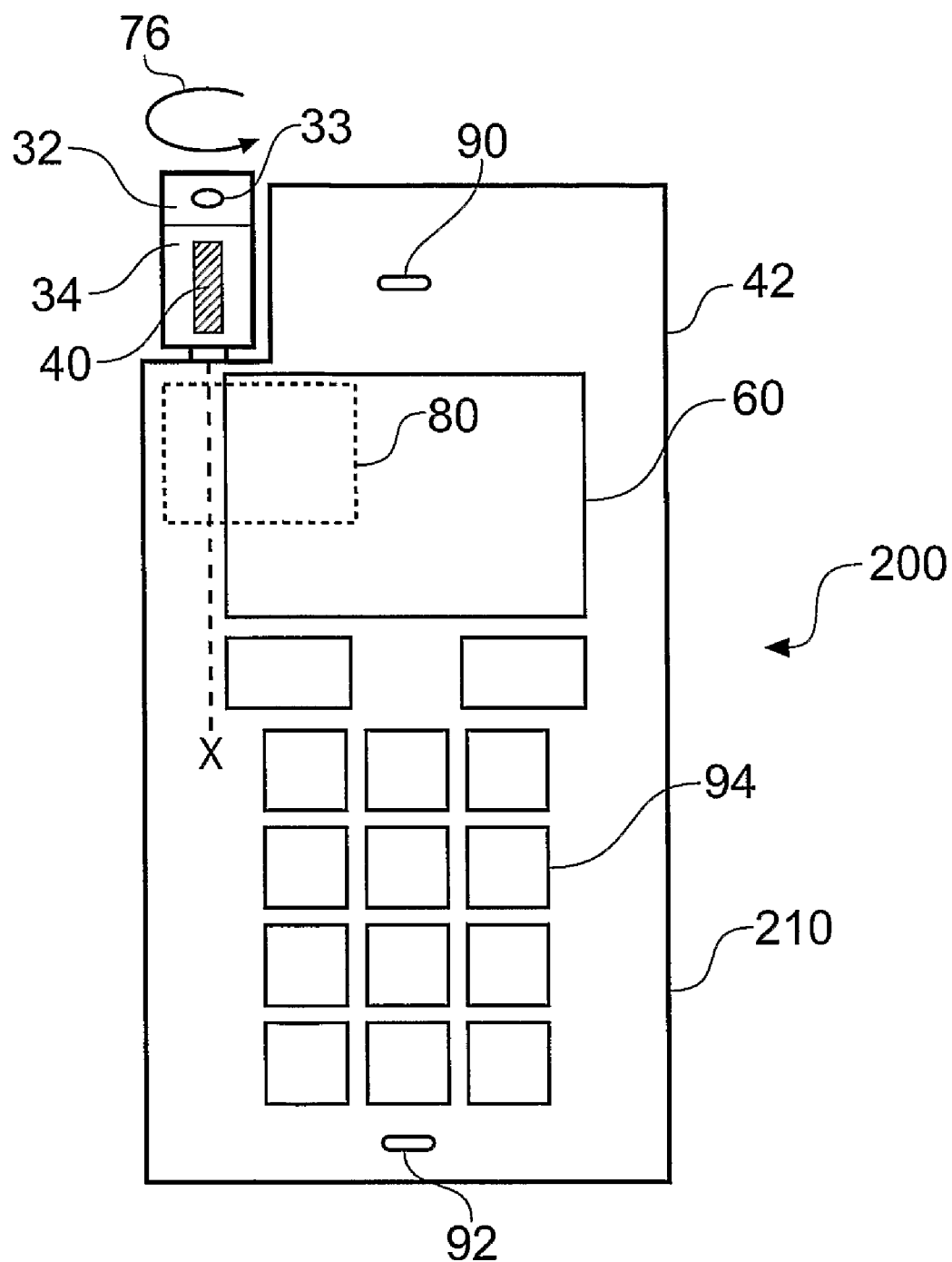
FIG. 5 illustrates a second portable radio telephone comprising a rotating flash unit.
Figure 6:
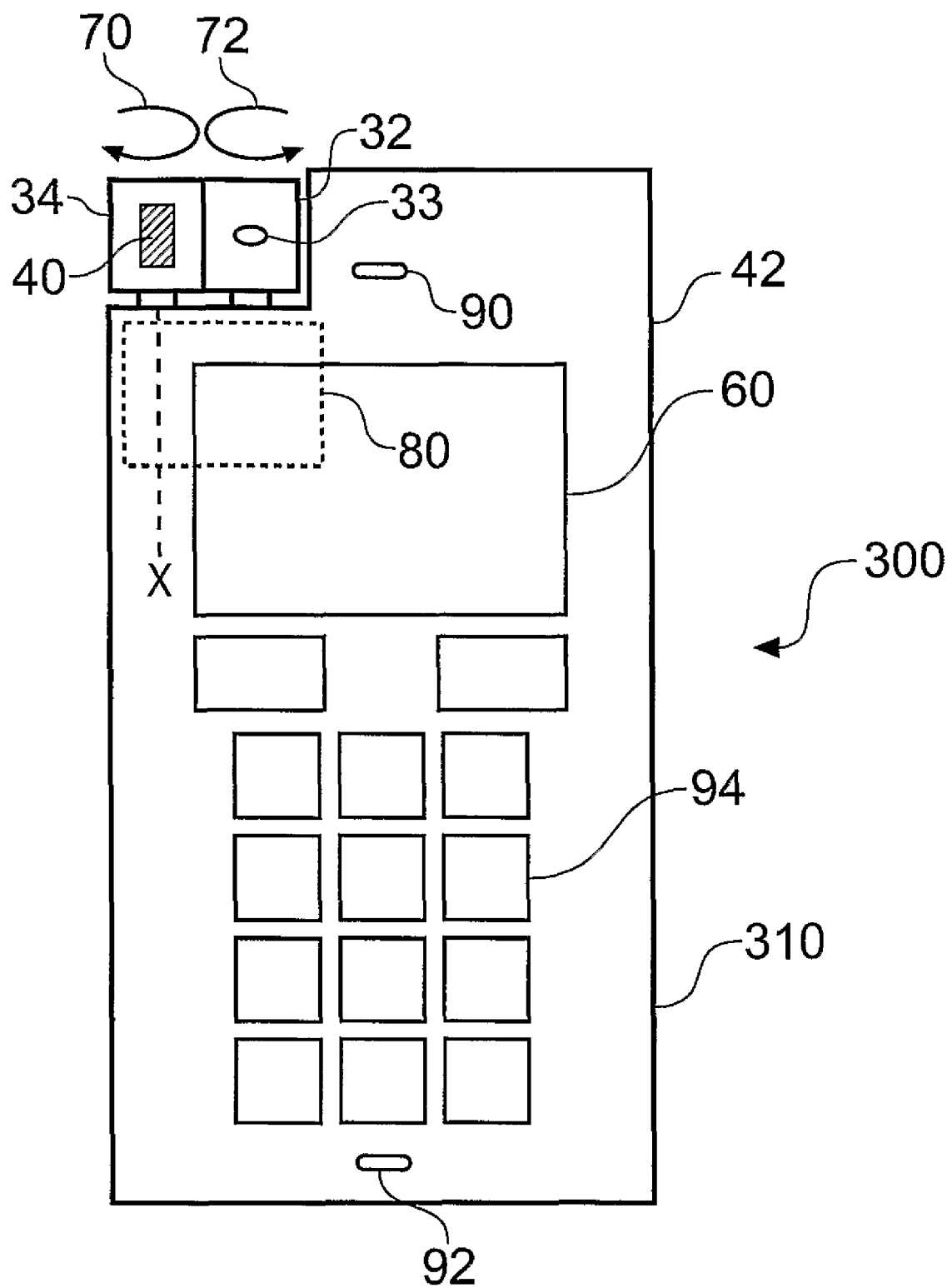
FIG. 6 illustrates a third portable radio telephone comprising a rotating flash unit.

The electrical connector 16 which connects to the reflector 12, and the electrodes 22 which connect to the xenon tube 14, are all connected to flash circuitry 80 within the device 100/200/300 (see FIGS. 4 to 6). The flash circuitry 80 is used to generate the thigh trigger voltage to be applied to the reflector 12, and also the current required for the connectors 22, after the flash has been triggered.

Figure 3:
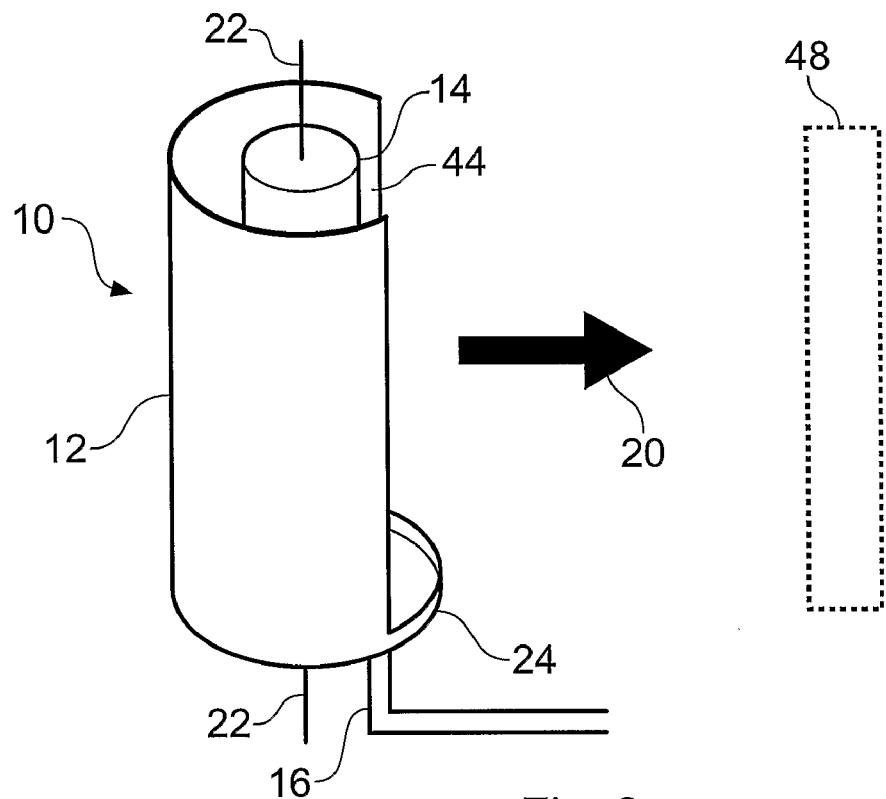
FIG. 3 illustrates a flash unit incorporating a connecting rail.

FIG. 3 illustrates a flash unit 10 which also comprises a connecting rail 24. By incorporating a connecting rail 24, the reflector 12 may rotate through 360° relative to the axis of the tube 14 while maintaining a connection with connector 16. Thus, the tube 14 can be triggered at any position of the reflector 12.

In each of these examples, it can be seen that the direction 20 can be changed by turning the reflector 12 relative to the tube 14, but without requiring the tube 14 to turn, and without losing the ability to apply the trigger voltage to the reflector 12.

FIG. 4 shows how the flash unit 10 of FIGS. 1, 2 or 3 may be incorporated into the clamshell hand portable radio telephone 100. The radio telephone 100 comprises communications circuitry, as known in the art, allowing it to operate as a telephone in a cellular network. The radio telephone 100 has a first housing 110 and a second housing 112. The first and second housings 110 and 112 are rotatably connected by a hinge 26. The first housing 110 comprises a display 60 and an earpiece 90, and the second housing 112 comprises a keypad 94 and a microphone 92. The flash circuitry 80 is fixedly positioned in the second housing 112.

The hinge 26 comprises a camera housing 32 with an aperture 33. A camera contained in the housing 32 is used to capture images through the aperture 33. The camera housing 32 is rotatable in the direction of the arrow 36. Accordingly, the direction in which images are captured by the camera, through the aperture 33, can be changed relative to the device 100. In a particular example, images can be captured at least in two directions which are 180° apart, toward the user and away from the user, when the user is holding the device 100 to view the display 60 and operate the keypad 94. The flash housing 34 contains the reflector 12. The flash tube 14 is mounted to the housing 112 and extends into the flash housing 34. The flash housing 34 is also rotatable in the direction of arrow 36, causing the reflector 12 to rotate about the tube 14, as described above. The flash housing 34 comprises a window 40 corresponding with the position of the gap 44. Rotation of the housing 34 therefore changes the direction 20 of the light produced.

The flash housing 34 is preferably able to turn to direct light over the same range of directions as the camera is able to capture images, so that the subject can always be illuminated. In particular, the housing 34 preferably at least has two available positions, directed in a first direction towards the user as he looks at the display, 60, and another directed in a second direction which is substantially opposite to the first direction, the second direction being away from the user as he looks at the display 60. A detent or latch arrangement may be provided to allow the flash housing 34 and camera housing 32 to be retained at these positions.

The camera housing 32 and the flash housing 34 may therefore be directed towards the user when he wishes to take a picture of himself and away from the user when he wishes to take pictures of other things. The position of the device 100 can remain constant and comfortable for viewing the screen 60. However, when the camera housing 32 or the flash housing 34 are moved, the xenon tube 14 and the flash circuitry 80 do not move relative to the housing 112. Furthermore, no movement of the display 60 or the keypad 94 is required when the user wishes to capture images in different directions, using the camera and the flash unit 10.

The flash housing 34 may be coupled to the camera housing 32 so that rotation of the flash housing 34 also causes the housings 32, 34, to rotate together. Similarly, rotation of the camera housing 32 by the user will also cause rotation of the flash housing 34, in this example.

In the embodiment illustrated in FIG. 4, a cylindrical xenon tube 14 is fixed in position within and aligned with the rotation axis of the housing 34, which is also preferably the axis of, the hinge 26. The flash circuitry 80 is fixedly positioned in the second housing 112 of the main body 42 of the clamshell device 100. Consequently the flash circuitry 80 and the xenon tube 14 do not move in relation to one another even when the flash housing 34 is turned. The connectors 22 which connect the xenon tube 14 to the flash circuitry 80 are therefore not required to accommodate movement and can readily be designed to carry the high current which flows through the connectors 22. Consequently, the problems associated with having to provide thick, moving connectors for high current are avoided. A rotating flash arrangement is thus provided by embodiments of the invention, while keeping the xenon tube 14 and the flash circuitry 80 fixed in position relative to one another and to the main body 42 of the device 100.

FIG. 5 illustrates a further hand portable radio telephone 200 which comprises the flash unit 10 of FIGS. 1, 2 or 3. The radio telephone 200 illustrated in FIG. 5 has a housing 210, which comprises a display 60, an earpiece 90, a microphone 92 and a keypad 94. The radio telephone 200 also comprises communications circuitry, as known in the art, enabling it to operate as a telephone in a cellular network.

A rotatable camera housing 32 and a rotatable flash housing 34 are again provided, located in this example, at one corner of the device 200. The arrow 76 shows the direction of rotation of both the camera housing 32 and the flash housing 34 relative to the main body 42 of the device 200, about a common axis x. In the embodiment shown in FIG. 5, the xenon tube 14 is elongate and cylindrical. The xenon tube 14 is mounted within the device 200 so that it extends into the flash housing 34 and so that its elongate axis is aligned with the rotation axis x.

In a similar fashion to the flash housing 34 described in relation to FIG. 4, the reflector 12 is mounted in the flash housing 34, around the tube 14. Thus, when the flash housing 34 is rotated in the direction of arrow 36, the reflector 12 therefore also rotates, around the tube 14, thereby redirecting the light output relative to the device 200. Furthermore, the flash housing 34 may rotate with the camera housing 32, or the camera housing 32 and the flash housing 34 may rotate separately. Again, the flash housing 34 is preferably able to turn to direct light over the same range of directions as the camera is able to capture images by turning the camera housing 32.

FIG. 6 illustrates another hand portable radiotelephone 300 which incorporates the flash unit 10 of FIGS. 1, 2 or 3. The radio telephone 300 illustrated in FIG. 6 has a housing 310, which comprises a display 60, an earpiece 90, a microphone 92 and a keypad 94. The radio telephone 300 also comprises communications circuitry, as known in the art, enabling it to operate as a telephone in a cellular network.

In this embodiment, the flash housing 34 may be constructed in the same manner as the flash housing of FIG. 5, and is arranged to be rotatable in a first sense indicated by the arrow 70. The camera housing 32 is generally similar to the housing 32 of FIG. 5, but is arranged alongside the housing 34, so that the respective rotation axes are parallel but not coincident. Moreover, the housing 32 rotates in the opposite sense to flash housing 34, as indicated by the arrow 72. The camera housing 32 and the flash housing 34 are coupled so that rotational movement of one of the camera housing 32 or the flash housing 34 causes the rotational movement of the other in the opposite direction. For example, each may carry a gear ring, the gear rings mashing to create the coupling. Alternatively, friction may be used to provide the coupling. The camera aperture 33 and the flash housing 34 will face the same direction only when they are in one of two positions: a first position in which both the aperture 33 and the housing 34 are facing the user as he looks at the display 60, and a second, different, position in which both the aperture and the housing 34 are facing away from the user as he looks at the display 60. Accordingly, the flash direction and the image capture direction are aligned at the two most common image capture directions.

Figure 7:
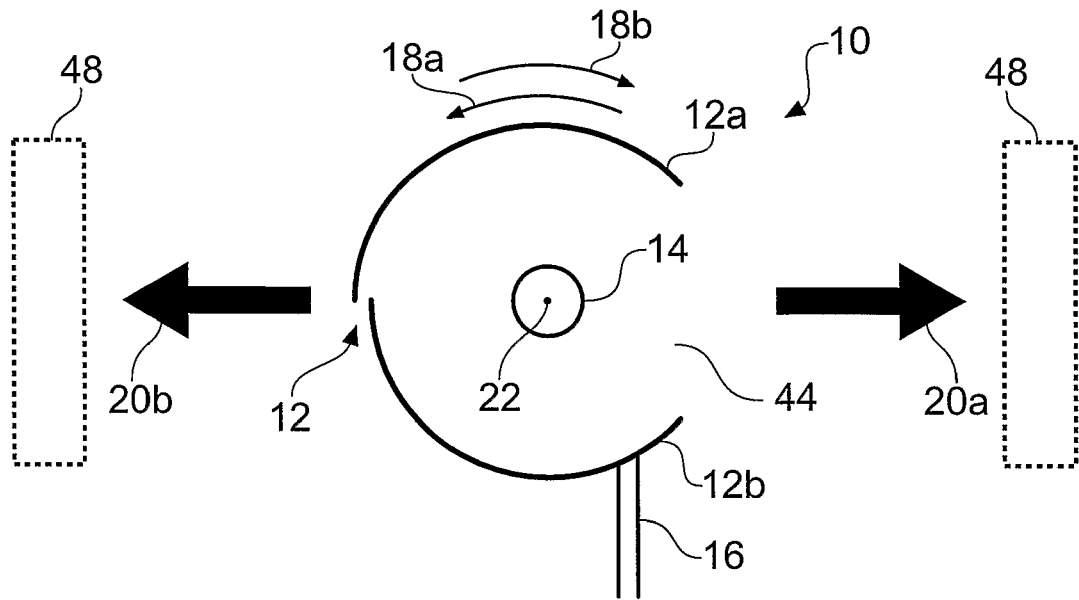
FIG. 7 illustrates a side elevation of a flash unit with a two part reflector.
Figure 8:
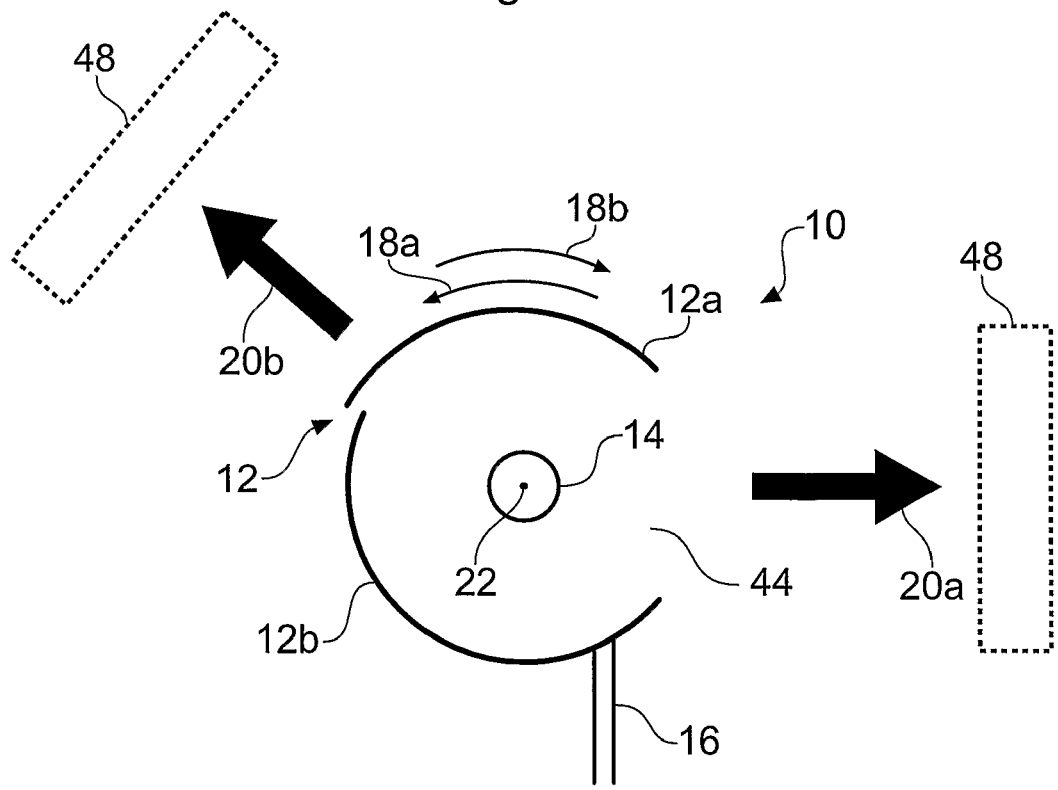
FIG. 8 illustrates a side elevation of a further flash unit with a two part reflector.

Two further embodiments of the flash unit 10 are illustrated in FIGS. 7 and 8. In both of the embodiments, the reflector 12 is in two parts. The reflector 12 has a curved movable part 12a and a curved fixed part 12b. In these embodiments, the fixed part 12b of the reflector is fixed relative to the tube 14 and acts as the trigger plate. When incorporated into a portable device, the fixed part 12b of the reflector is fixed relative to a housing of the device.

In the configuration shown in FIG. 7, when light is emitted from the tube 14, it either passes directly through the gap 44 or it is reflected by the parts 12a and 12b of the reflector 12 towards the gap 44. Light is therefore emitted through the gap 44 in the general direction of large arrow 20a. The movable part 12a is rotatable in the direction 18b. When the movable part 12a is rotated in the direction 18b, it may be positioned such that it obscures the gap 44. In this instance, a new gap is created at the opposite side of flash unit 10, between the movable part 12a and the fixed part 12b. Light from the tube 14 will then exit the reflector arrangement 12 in the direction of large arrow 20b, which is substantially opposite to direction 20a.

In order to close the gap that has been formed by the rotation of the movable part 12a in the direction 18b and to restore the gap 44 between the movable part 12a and the fixed part 12b, the movable part 12a may be rotated in the direction 18a back to its position in FIG. 7.

A lens 48 may be provided at the points at which the light is emitted from the reflector arrangement 12, to direct the light.

The configuration of FIG. 7 is advantageous in that the direction in which light is emitted from the flash unit 10 may be changed by 180° through a relatively small amount of rotation of the movable part 12a (i.e. much less than the 180° change in the direction of emitted light). A further advantage is that as the fixed part 12b is fixed relative the main body of the device that it is incorporated in, the connector 16 need not move and the connection point between the connector 16 and the fixed part 12b need not move.

FIG. 8 also illustrates a flash unit 10 which comprises a two part reflector 12. The embodiment in FIG. 8 is similar to that in FIG. 7 in that the fixed part 12b of the reflector 12 is fixed relative to the tube 14 and the movable part 12a of the reflector 12 is rotatable in directions 18a and 18b. The embodiment in FIG. 8 is different to that in FIG. 7, however, in that the direction 20b in which light is emitted from the new gap after rotation of the movable part 12a in the direction 18b is not opposite to the direction 20a in which the light was initially emitted from the gap 44. This can be achieved by increasing the size of the fixed part 12b, decreasing the size of the movable part 12a and changing the relative positioning of the two parts 12a and 12b. The size and relative positioning of the movable part 12a and the fixed part 12b may be altered as required so that rotation of the movable part 12a allows light to leave the flash unit 10 in any two desired directions.

Each of the hand portable radiotelephones 100/200/300 in FIGS. 4, 5 and 6 have a flash housing 34 with a front window 40. However, when the embodiments of FIG. 7 and FIG. 8 are incorporated into a telephone 100/200/300, the movable part 12a of the reflector 12 rotates with the flash housing 34 when it is rotated, but the fixed part 12b remains fixed. A second window may be incorporated in the flash housing 34 to allow the light to be emitted from the flash housing 34 when the movable part 12a has been rotated in the direction 18b. In the case of the FIG. 7 embodiment, the second window is on the opposite side of the flash housing 34 to the first window 40.

When the FIG. 7 and FIG. 8 embodiments are incorporated into the radio telephones 100/200/300 in, FIGS. 4, 5 and 6, a gearing mechanism may be used to couple the camera housing 32 to the flash housing 34. The movable part 12a of the reflector 12 moves with the flash housing 34, while the fixed part 12b remains fixed relative to the main body of the device 100/200/300. Using the gearing mechanism, a relatively small amount of rotation of the flash housing 34 results in a relatively large amount of rotation of the camera housing 32, ensuring that the camera aperture 33 faces in the same direction as the direction that light is emitted from the flash housing 34.

Although embodiments of the invention have been described in the preceding 5 paragraphs with reference to various examples, it should be appreciated that modifications to the examples given can be made without departing from the scope of the invention as claimed. For example, the lighting element 14 may be a white LED rather than a xenon tube.

Other trigger arrangements could be used. For instance, the trigger voltage may be applied by a wire spirally wrapped from one end of the xenon tube 14 to another. A separate, rotatable reflector plate would be provided to enable the light emitted from the xenon tube 14 to be reflected in a desired direction. Advantageously, such a configuration would not need any moving connectors because as the ionising wire would be fixed in position around the tube.

The camera arrangement may comprise two separate cameras, each of which is fixed but are directed in two different directions, instead of a movable camera and housing. A user interface would allow the user to select which camera direction he wishes to use. The movable flash housing could then be positioned manually or automatically according to which camera aperture the user has chosen to use.

The electrical connector 16 which connects to the reflector 12 to the flash circuitry 80 may have a fixed connection point in the FIG. 1, 2 and 3 embodiments of the flash unit 10, the connector 16 being a flexible connector.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has placed thereon.

I claim:

1. An apparatus comprising:
    a camera arrangement configured to capture images in a plurality of directions relative to a main body of the apparatus;
    a lighting element;
    a reflector, at least a portion of which is movable about the lighting element to change the direction of light from the lighting element;
    a voltage source configured to provide a voltage to operate the lighting element; and
    a wiper connector configured to electrically connect the voltage source to the reflector, in order to apply a voltage to the reflector to operate the lighting element, wherein a point of connection between the wiper connector and the reflector is variable in dependence upon movement of at least a portion of the reflector about the lighting element, and wherein the reflector is configured to maintain an electrical connection between the voltage source and the reflector as at least a portion of the reflector rotates, about the lighting element, around at least 360°.

2. The apparatus as claimed in claim 1, wherein the camera arrangement comprises a camera with an aperture movable relative to the main body to change the direction from which images are captured.

3. The apparatus as claimed in claim 1, wherein at least a portion of the reflector is movable by a user.

4. The apparatus as claimed in claim 1, wherein at least a portion of the reflector is movable by rotation around the lighting element.

5. The apparatus as claimed in claim 4, wherein the camera arrangement comprises a camera with an aperture that is rotatable by a user relative to the main body to change the direction from which images are captured, and the camera aperture and at least a portion of the reflector is rotatable around substantially parallel axes.

6. The apparatus as claimed in claim 4, wherein the camera arrangement comprises a camera with an aperture that is rotatable by a user relative to the main body to change the direction from which images are captured, and at least a portion of the reflector is rotatable around substantially the same axis.

7. The apparatus as claimed in claim 2, wherein the apparatus further comprises a coupler acting between the reflector and the camera arrangement and so arranged that movement of the camera aperture causes movement of the reflector.

8. The apparatus as claimed in claim 7, wherein the coupler is configured to provide at least two positions for the camera aperture at which there is substantial alignment between the direction from which images are captured and the direction to which light is reflected, in use, by the reflector.

9. The apparatus as claimed in claim 1, wherein the camera arrangement is configured to capture images in a first direction and in a second direction which is substantially opposite to the first direction.

10. The apparatus as claimed in claim 1, wherein the reflector has a curved surface.

11. The apparatus as claimed in claim 1, wherein the lighting element has an elongate portion and the reflector is movable around the elongate portion.

12. The apparatus as claimed in claim 1, wherein the lighting element is fixedly positioned in the main body.

13. The apparatus as claimed in claim 1, wherein the voltage source fixedly positioned in the main body of the apparatus.

14. The apparatus as claimed in claim 1, wherein the lighting element comprises a xenon tube.

15. A method, comprising:
   changing, when at least a portion of a reflector is moved about a lighting element around at least 360°, the direction of light from the lighting element while maintaining an electrical connection between a voltage source and the reflector using a wiper connector, wherein a point of connection between the wiper connector and the reflector varies as the at least a portion of the reflector is moved, and the voltage source is configured to apply a voltage to the reflector to operate the lighting element; and
   capturing an image with a camera arrangement using the directed light from the lighting element.

16. A method as claimed in claim 15, further comprising adjusting the camera arrangement to change the direction from which images are captured, to correspond with the direction to which light is directed by the reflector.

17. The apparatus as claimed in claim 1, wherein the reflector comprises a connecting rail that is configured to maintain an electrical connection between the voltage source and the reflector as at least a portion of the reflector rotates, about the lighting element, around at least 360°.

18. The method as claimed in claim 15, wherein the reflector comprises a connecting rail that maintains an electrical connection between the voltage source and the reflector as at least a portion of the reflector rotates, about the lighting element, around at least 360°.

* * * * *